US 6,359,674 B1

(12) United States Patent
Horiuchi

(10) Patent No.: US 6,359,674 B1
(45) Date of Patent: Mar. 19, 2002

(54) LIQUID CRYSTAL LENS, LIQUID CRYSTAL LENS UNIT, AND LIQUID CRYSTAL LENS ASSEMBLY

(75) Inventor: Katsuji Horiuchi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/589,445

(22) Filed: Jun. 7, 2000

(30) Foreign Application Priority Data

Jun. 8, 1999 (JP) .......................................... 11-160879

(51) Int. Cl.[7] ........................... G02F 1/03; G02F 1/1345
(52) U.S. Cl. ..................... 349/200; 349/149; 359/254
(58) Field of Search .................. 349/200, 77; 359/254

(56) References Cited

U.S. PATENT DOCUMENTS 4,190,330 A * 2/1980 Berreman .................... 349/200
4,572,616 A * 2/1986 Kowel et al. ................ 349/200
5,097,352 A * 3/1992 Takahashi et al. .......... 349/200
5,150,234 A * 9/1992 Takahashi et al. .......... 349/200

* cited by examiner

Primary Examiner—Toan Ton
(74) Attorney, Agent, or Firm—Frishauf, Holtz, Goodman, Langer & Chick, P.C.

(57) ABSTRACT

A liquid crystal lens comprises a biconcave lens and a pair of transparent flat plates arranged before and behind the lens. The biconcave lens has a pair of concave principal surfaces covered with transparent electrodes, a flat portion on its outer periphery, and an electrode extending across the flat portion and connecting the transparent electrodes. Each of the transparent flat plates has a flat principal surface covered with a transparent electrode, the surface facing the concave principal surface, a flat portion on its outer periphery, and an electrode extending across the flat portion and connected to the transparent electrode. The biconcave lens and the pair of transparent flat plates are cemented to one another in a spaced manner by sealants with their respective flat portions flush with one another. Liquid crystals are stored individually in spaces defined between the lens and the flat plates.

14 Claims, 6 Drawing Sheets

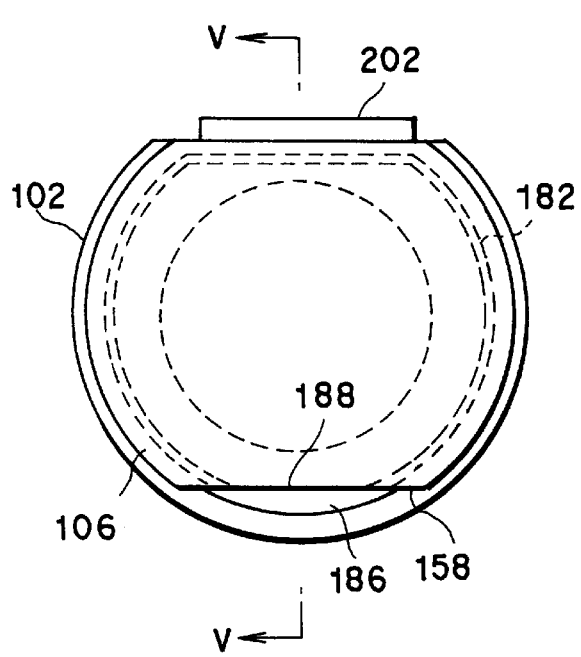 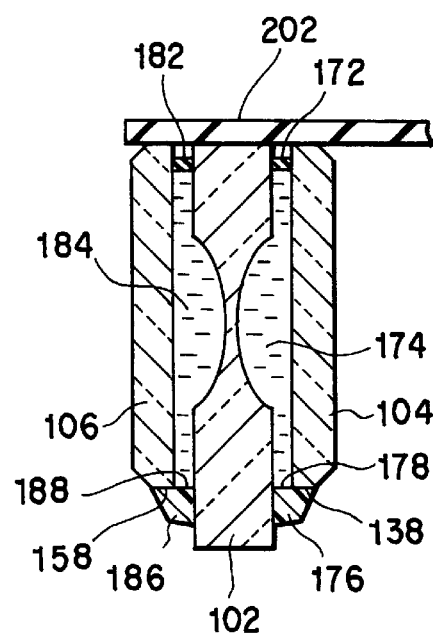
FIG. 4  FIG. 5
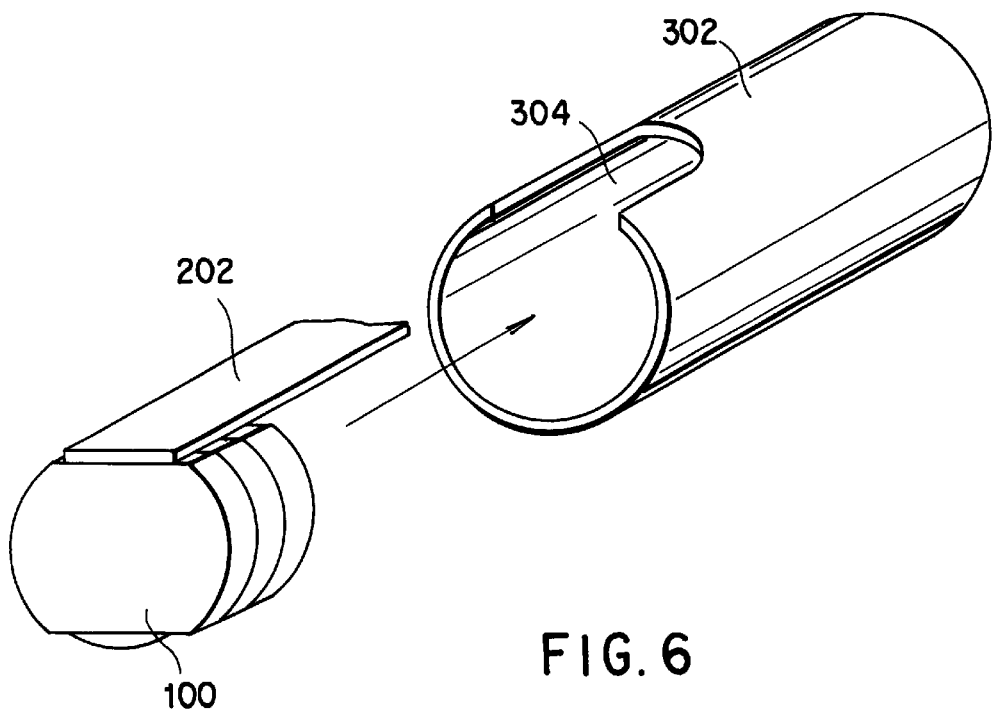
FIG. 6

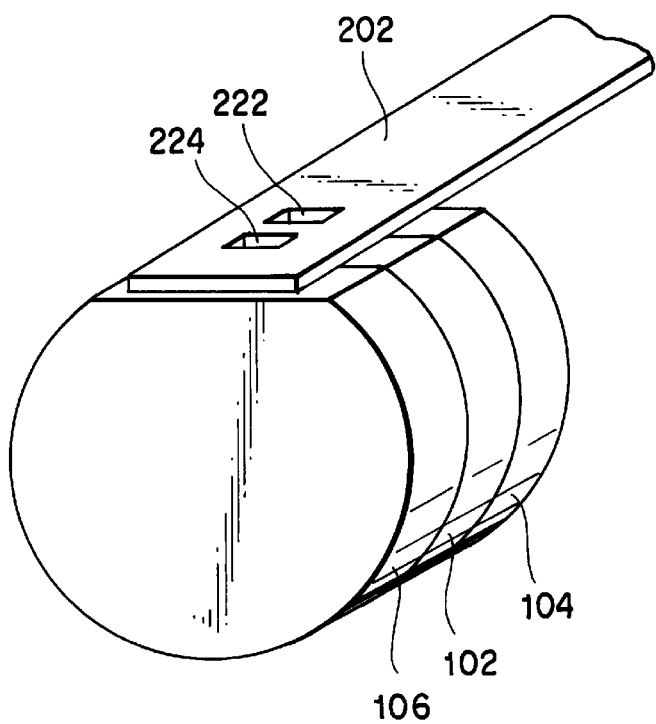
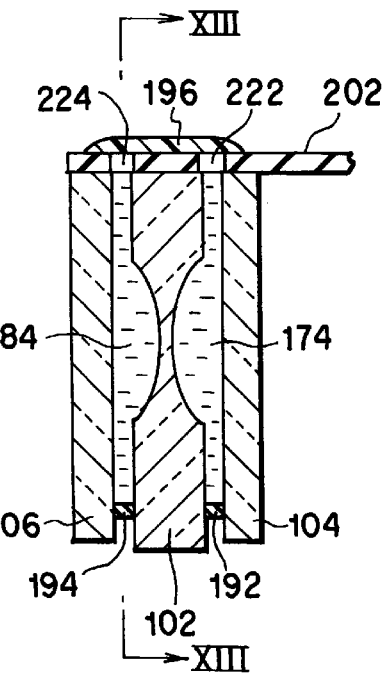
FIG. 11
FIG. 12
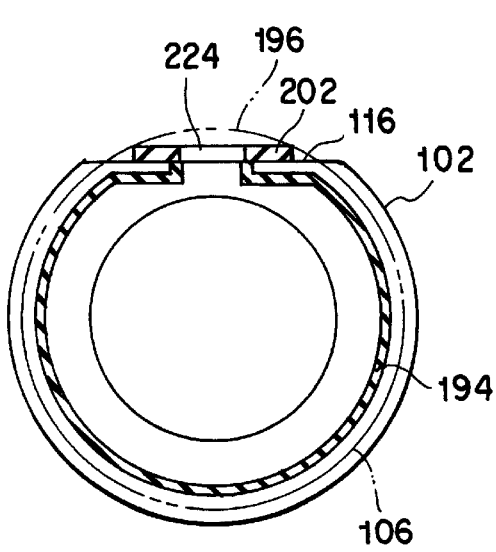
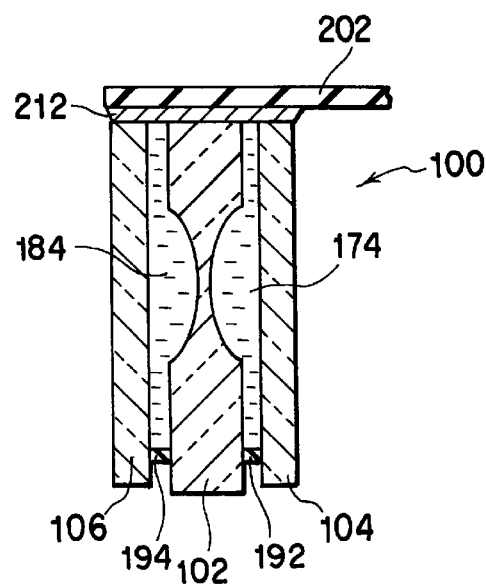
FIG. 13
FIG. 14

# LIQUID CRYSTAL LENS, LIQUID CRYSTAL LENS UNIT, AND LIQUID CRYSTAL LENS ASSEMBLY

CROSS-REFERENCE TO RELATED APPLICATIONS

This application is based upon and claims the benefit of priority from the prior Japanese Patent Application No. 11-160879, filed Jun. 8, 1999, the entire contents of which are incorporated herein by reference.

BACKGROUND OF THE INVENTION

The present invention relates to a liquid crystal lens device, which can change its focus position by varying the electric field strength.

A liquid crystal lens device of this type is described, for example, in U.S. Pat. No. 4,190,330 entitled "Variable Focus Liquid Crystal Lens System."

This liquid crystal lens device comprises a first body including a birefringent nematic liquid crystal material oriented in a first direction, a second body including a birefringent nematic liquid crystal material oriented in a second direction perpendicular to the first direction, a pair of electrodes for applying electric fields with components perpendicular to the first and second directions to the first and second bodies, and means for varying the electric field strength.

When no electric fields are applied to the first and second bodies, with respect to components of light polarized perpendicular to the first direction of the incident end of the first body, included in incident light, the first body serves as a medium having an ordinary index of the liquid crystal material, and the second body as a medium having an extraordinary index of the liquid crystal material. With respect to components of light polarized parallel to the first direction of the incident end of the first body, in contrast with this, the first body serves as a medium having an extraordinary index of the liquid crystal material, and the second body as a medium having an ordinary index of the liquid crystal material.

When the electric fields are applied to the first and second bodies with use of the means for varying the electric field strength, either of the first and second bodies serves as a medium having an ordinary index of the liquid crystal material.

Thus, in the liquid crystal lens device, the index can be changed by varying the electric field strength, so that the focus position can be changed without mechanically moving any parts of the device.

Endoscopes require use of a variable focus system, which ensures continual production of clear images such that the affected part can be diagnosed more accurately.

A modern endoscope reduced much in diameter has so narrow a space that it is hard for an imaging optical system holding member in the distal end portion of the endoscope to contain a variable focus system based on mechanical means. Preferably, therefore, the variable focus system should comprise electrical means including no mechanically-operated parts. The aforementioned liquid crystal lens device can be an example of potent electrical means.

The wall thickness of the imaging optical system holding member is made as thin as possible to reconcile the reduced diameter and the maximum volume of emission. In order to secure the necessary minimum stiffness of the optical system holding member, therefore, it is advisable to minimize the size of notches in the holding member for mounting a liquid crystal lens. Thus, it is to be desired that the liquid crystal lens device, which is intended to be built in an endoscope, should have a compact external shape involving fewer projections.

For example, the small-diameter endoscope has an outside diameter of about 13 mm, and the imaging optical system holding member to be incorporated therein has an outside diameter of about 4.5 mm and an overall length of about 10 mm. Thus, the liquid crystal lens itself is expected to have a diameter of about 2 mm and a thickness of about 0.5 mm.

BRIEF SUMMARY OF THE INVENTION

The present invention has been contrived in consideration of these circumstances, and its object is to provide a liquid crystal lens device adapted to be incorporated in a narrow cylindrical member.

The liquid crystal lens device described herein is supposed to include a simple liquid crystal lens, a liquid crystal lens unit comprising the liquid crystal lens and a wiring board attached thereto, and a liquid crystal lens assembly comprising the liquid crystal lens unit and a lens frame supporting the same.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a front view of the liquid crystal lens unit comprising the liquid crystal lens and the flexible printed wiring shown in FIG. 2;

FIG. 5 is a sectional view of the liquid crystal lens unit taken along line V—V of FIG. 4;

FIG. 6 is a perspective view showing the liquid crystal lens unit and an optical system lens frame, which constitute a liquid crystal lens assembly according to the first embodiment;

FIG. 11 is a perspective view of a liquid crystal lens unit according to a fourth embodiment of the invention before liquid crystals is injected therein;

FIG. 12 is a side sectional view of the liquid crystal lens unit according to the fourth embodiment;

FIG. 13 is a sectional view of the liquid crystal lens unit taken along line XIII—XIII of FIG. 12; and FIG. 14 is a side sectional view of a liquid crystal lens unit according to a fifth embodiment of the invention.

DETAILED DESCRIPTION OF THE INVENTION

First Embodiment

Figure 1:
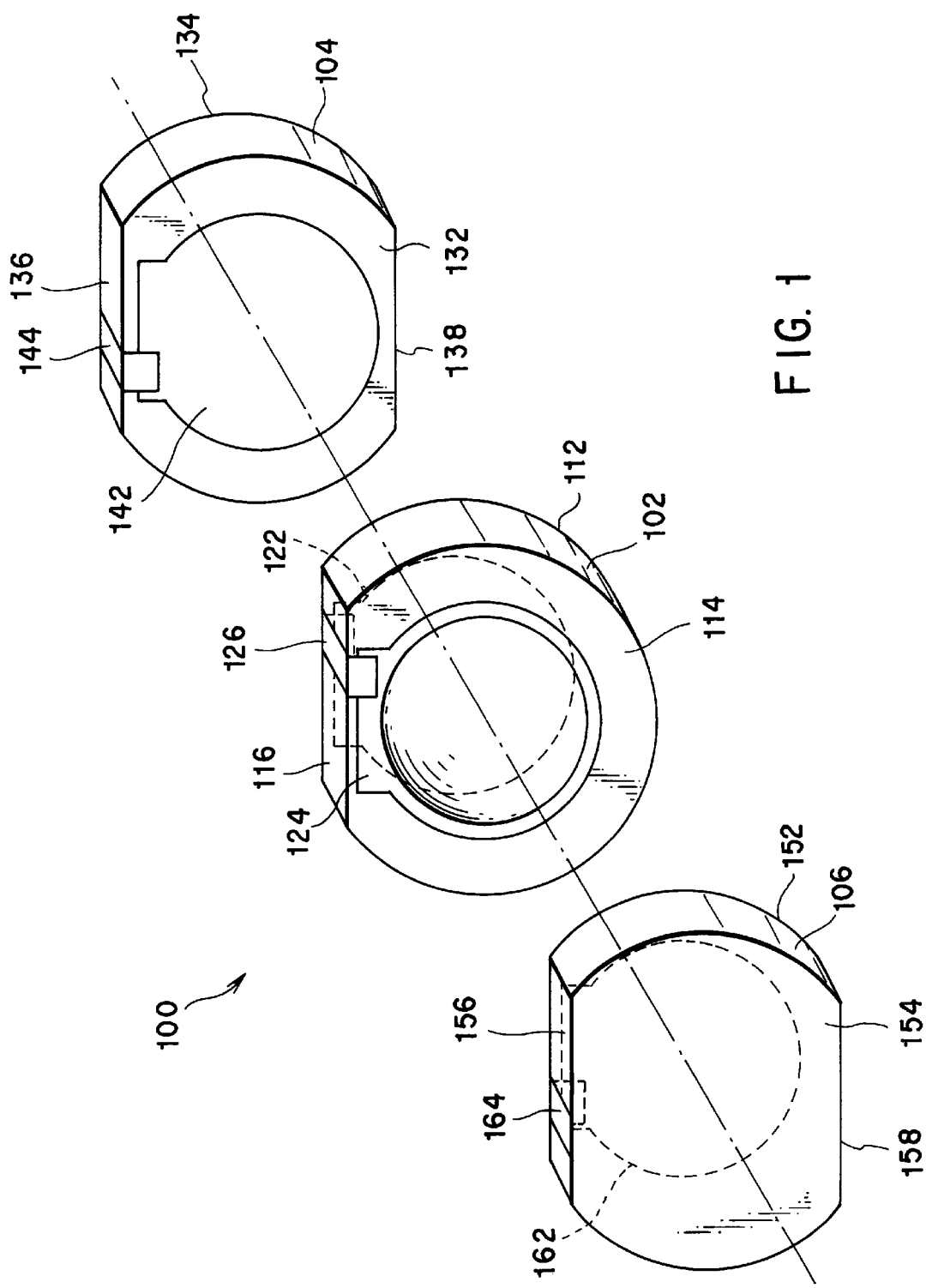
FIG. 1 is a perspective view showing before cemented principal elements of a liquid crystal lens according to a first embodiment of the invention.

As shown in FIG. 1, a liquid crystal lens 100 comprises a biconcave lens 102 and a pair of transparent flat plates 104 and 106, which are arranged before and behind the lens 102 along the optical axis thereof.

The biconcave lens 102 is formed of an optically satisfactory optical glass substantially in the form of a cylinder, and includes a flat portion 116 on a part of its outer periphery. The lens 102 has a pair of principal surfaces 112 and 114, which face each other therethrough. Symmetrical concave surfaces are formed on the principal surfaces 112 and 114, individually. These concave surfaces have a common axis, which is aligned with the axis of an optical system lens frame 302 when the biconcave lens 102 is fitted in the frame 302, which will be described later with reference to FIG. 6.

An undercoat (not shown), a transparent electrode 122, and an orientation film (not shown) are built up on the concave surface of the principal surface 112. Likewise, an undercoat (not shown), a transparent electrode 124, and an orientation film (not shown) are built up on the concave surface of the principal surface 114.

The two transparent electrodes 122 and 124 are connected electrically to each other by means of an electrode 126, which extends across the flat portion 116 to the principal surfaces 112 and 114. Further, the orientation films, which are arranged individually on the principal surfaces 112 and 114, are oriented at right angles to each other.

The transparent flat plate 104 is formed of an optically satisfactory optical glass substantially in the form of a cylinder, which has a diameter slightly smaller than that of the biconcave lens 102, and includes parallel flat portions 136 and 138 in two positions on its outer periphery. The flat plate 104 has a pair of principal surfaces 132 and 134, parallel flat surfaces.

An undercoat (not shown), a transparent electrode 142, and an orientation film (not shown) are built up on the principal surface 132 of the transparent flat plate 104, which faces the principal surface 112 of the biconcave lens 102. Further, an antireflection coating (not shown) is formed on the principal surface 134 on the opposite side.

An electrode 144 is formed extending across the flat portion 136. The electrode 144 extends to the principal surface 132, and is connected electrically to the transparent electrode 142. The direction of orientation of the orientation film on the principal surface 132 is parallel to that of the orientation film on the principal surface 112 of the biconcave lens 102 when the flat portion 136 of the transparent flat plate 104 is made flush with the flat portion 116 of the lens 102.

The transparent flat plate 106, which has the same shape as the transparent flat plate 104, is formed of an optically satisfactory optical glass substantially in the form of a cylinder, which has a diameter slightly smaller than that of the biconcave lens 102, and includes parallel flat portions 156 and 158 in two positions on its outer periphery. The flat plate 106 has a pair of principal surfaces 152 and 154, parallel flat surfaces.

An undercoat (not shown), a transparent electrode 162, and an orientation film (not shown) are built up on the principal surface 152 of the transparent flat plate 106, which faces the principal surface 114 of the biconcave lens 102. Further, an antireflection coating (not shown) is formed on the principal surface 154 on the opposite side.

An electrode 164 is formed extending across the flat portion 156. The electrode 164 extends to the principal surface 152, and is connected electrically to the transparent electrode 162. The electrodes 162 and 164 of the transparent flat plate 106 are located in positions symmetrical to the electrodes 142 and 144 of the transparent flat plate 104 with respect to a plane.

Further, the direction of orientation of the orientation film on the principal surface 152 is parallel to that of the orientation film on the principal surface 114 of the biconcave lens 102 when the flat portion 156 of the transparent flat plate 106 is flush with the flat portion 116 of the lens 102.

As mentioned later, the biconcave lens 102 and the transparent flat plates 104 and 106 are cemented to one another in a manner such that their respective flat portions 116, 136 and 156 are flush with one another.

The flat portions 116, 136 and 156 are utilized as reference surfaces for determining the directions in orientation process for the orientation films and as reference surfaces for cementing between the biconcave lens 102 and the transparent flat plates 104 and 106. Thus, the directions of orientation of the orientation films of the lens 102 and the flat plates 104 and 106 are settled according to the flat portions 116, 136 and 156, respectively, and the lens 102 and the flat plates 104 and 106 are cemented to one another with their respective flat portions 116, 136 and 156 flush with one another. In consequence, the directions of orientation of the two pairs of the facing orientation films are parallel, respectively.

The undercoats are formed of silicon dioxide, for example, serving as barriers to alkaline ions which liquate out of the biconcave lens 102 and the transparent flat plates 104 and 106.

Crown glass or flint glass is used as a optical glass for the biconcave lens 102 and the transparent flat plates 104 and 106, for example.

The transparent electrodes 122, 124, 142 and 162 are formed of optically transparent conductive films such as indium-tin oxide films, antimony-loaded tin oxide films, or zinc oxide films.

Each orientation film is an organic orientation film, such as a polyimide- or polyamide-based orientation film, which is obtained by orienting a liquid crystal material in a specific direction.

The electrodes 126, 144 and 164 comprises films of an electrically conductive material such as gold, silver, copper, nickel, chromium, or carbon.

As shown in FIG. 5, the biconcave lens 102 and the transparent flat plate 106 are cemented to each other by means of a sealant 182 including spacers (not shown) dispersed therein. As shown in FIG. 4, the sealant 182 circuits the whole transparent flat plate 106 except the region near the flat portion 158, within the area between the effective diameter and the outer diameter. Thus, the lens 102, flat plate 106, and sealant 182 define a space, which communicates with the outside space through a gap 188 near the flat portion 158 of the plate 106. This space can hold the liquid crystal material, and the gap 188 serves as a liquid crystal inlet port.

Likewise, the biconcave lens 102 and the transparent flat plate 104 are cemented to each other by means of a sealant 172 including spacers (not shown) dispersed therein, as shown in FIG. 5. The sealant 172, like the sealant 182, circuits the whole transparent flat plate 104 except the region near the flat portion 138. Thus, the lens 102, flat plate 104, and sealant 172 define a space, which communicates with the outside space through a gap 178 near the flat portion 138 of the plate 104.

The sealants 172 and 182 cement the biconcave lens 102 and the transparent flat plates 104 and 106, and seal the liquid crystal injected in the manner mentioned later. The spacers dispersed in the sealants 172 and 182 facilitate distance equalization between the flat plate 106 and the lens 102 and between the lens 102 and the flat plate 104.

As shown in FIG. 5, a liquid crystal 184, e.g., a nematic liquid crystal having positive dielectric anisotropy, is injected into the space defined by the biconcave lens 102, transparent flat plate 106, and sealant 182 through the liquid crystal inlet port 188. After the liquid crystal material is injected in this manner, the inlet port 188 is closed by means of a sealant 186. Likewise, a liquid crystal 174, e.g., a nematic liquid crystal, is injected into the space defined by the biconcave lens 102, transparent flat plate 104, and sealant 172 through the liquid crystal inlet port 178. After the liquid crystal material is injected in this manner, the inlet port 178 is closed by means of a sealer 176.

The liquid crystal material is injected in a manner such that the resulting structure is immersed in the liquid crystal material with the liquid crystal storage spaces evacuated. Since the liquid crystal material is sucked into the liquid crystal storage spaces under negative pressure, these spaces are filled up with the liquid crystal material.

The respective shapes of the liquid crystal layers 174 and 184 are important factors, which determine the optical properties of the liquid crystal lens 100. These shapes are settled depending on the shapes of two concave surfaces formed on the biconcave lens 102. Both these concave surfaces coaxial with the lens 102. When the biconcave lens 102 and the transparent flat plates 104 and 106 are cemented to one another, therefore, there can be no deviation between the respective optical axes of the liquid crystal layers 174 and 184.

The sealants 172 and 182 may be epoxy-based thermosetting sealants, epoxy-based ultraviolet-curing sealants, acryl-based thermosetting sealants, or acryl-based ultraviolet-curing sealants.

The spacers may be spherical glass spacers, spherical plastic spacers, amorphous glass spacers, or amorphous plastic spacers.

The sealers 176 and 186 may be epoxy-based thermosetting sealants, epoxy-based ultraviolet-curing sealants, acryl-based thermosetting sealants, or acryl-based ultraviolet-curing sealants.

Figure 2:
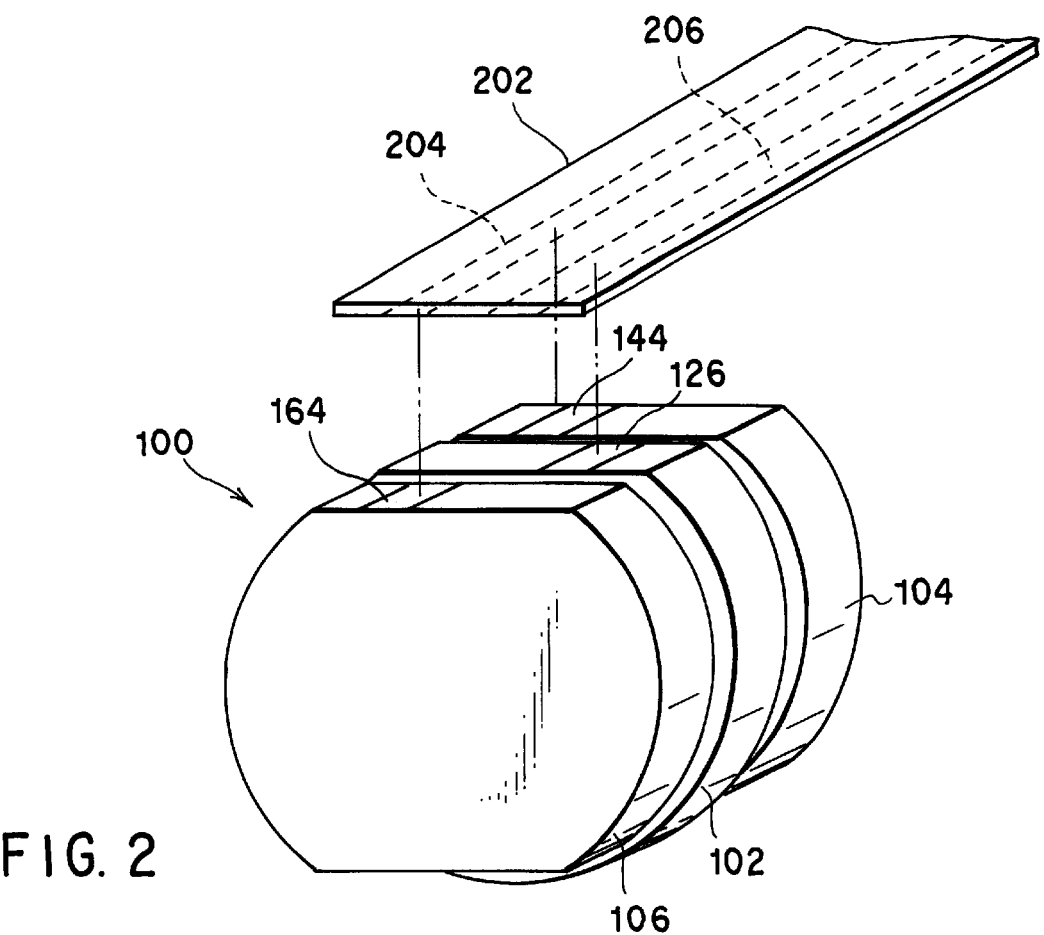
FIG. 2 is a perspective view showing the liquid crystal lens and a flexible printed wiring that constitute a liquid crystal lens unit according to the first embodiment.

As shown in FIG. 2, the liquid crystal lens 100 includes the biconcave lens 102 and the transparent flat plates 104 and 106, which are cemented to one another in a manner such that their respective flat portions 116, 136 and 156 are flush with one another. The electrodes 126, 144 and 164, which conduct to the transparent electrodes on the lens 102 and the flat plates 104 and 106, are exposed through the flat portions 116, 136 and 156, respectively. The electrodes 144 and 164 are situated on a line parallel to the optical axis of the liquid crystal lens 100, while the electrode 126 is situated off the line.

A flexible printed wiring 202 is wired on the flat portions 116, 136 and 156 of the liquid crystal lens 100, on which the electrodes 126, 144 and 164 are exposed. The printed wiring 202 has two parallel strip-shaped wires 204 and 206. The wire 204 is connected electrically to the respective electrodes 144 and 164 of the transparent flat plates 104 and 106, while the wire 206 is connected electrically to the electrode 126 of the biconcave lens 102.

Thus, the liquid crystal lens 100 and the flexible printed wiring 202 thereon constitute a liquid crystal lens unit.

Since the electrodes 144 and 164 extend parallel to the optical axis, they can be connected electrically to each other by means of the one wire 204 of the flexible printed wiring 202. Accordingly, the transparent electrodes 142 and 162 can be kept at the same potential. Further, the electrode 126 is connected electrically to the other wire 206 of the printed wiring 202. Thus, alternating voltages from a driver circuit (not shown) can be simultaneously applied to the liquid crystal layers 174 and 184 through the printed wiring 202 having only the two wires 204 and 206.

Figure 3:
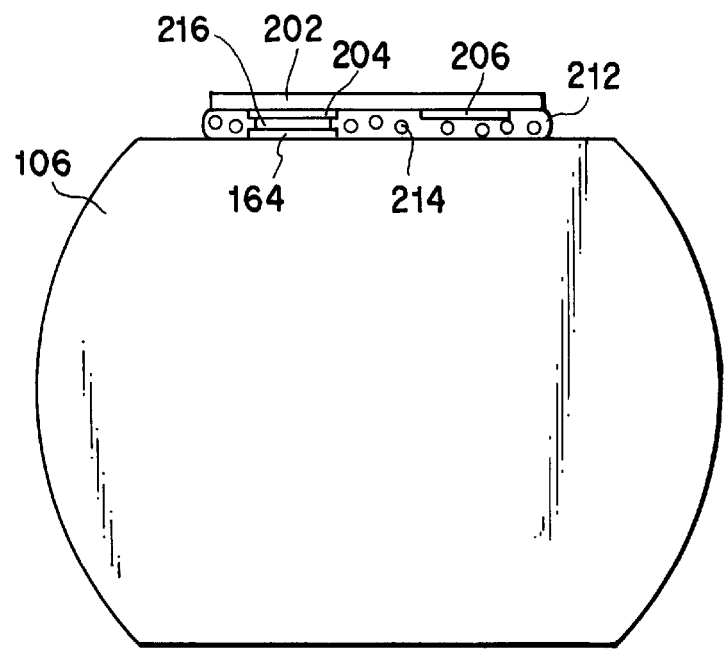
FIG. 3 schematically shows the way the liquid crystal lens and the flexible printed wiring shown in FIG. 2 are connected by means of an anisotropic conductive adhesive.

The flexible printed wiring 202 is wired on the liquid crystal lens 100 by means of an anisotropic conductive adhesive, for example. FIG. 3 schematically shows electrical connection between the electrode 164 of the transparent flat plate 106 and the wire 204 of the printed wiring 202 with use of the anisotropic conductive adhesive. As shown in FIG. 3, an anisotropic conductive adhesive 212 includes a large number of electrically conductive particles 214. When the printed wiring 202 is pressed against the liquid crystal lens 100, the conductive particles that are situated between the wires 204 and 206 of the printed wiring 202 and the electrodes 126, 144 and 164 of the lens 100 are crushed. The printed wiring 202 and the lens 100 are connected electrically to each other through the crushed particles 216.

The wires 204 and 206 of the flexible printed wiring 202 are connected to the driver circuit (not shown). The alternating voltages from the driver circuit are supplied to the liquid crystal lens 100 through the wires 204 and 206 and the electrodes 126, 144 and 164. More specifically, the alternating voltages are applied between the respective transparent electrodes 122 of the biconcave lens 102 and the transparent electrode 142 of the transparent flat plate 104 and between the respective transparent electrodes 124 of the lens 102 and the transparent electrode 162 of the transparent flat plate 106.

The liquid crystal lens unit, which includes the liquid crystal lens 100 and the flexible printed wiring 202 thereon, is mounted in the optical system lens frame 302, as shown in FIG. 6.

The optical system lens frame 302 has a notch 304 in its end portion in which the liquid crystal lens 100 is mounted. The notch 304 has a width greater than that of the printed wiring 202 so that it can avoid mechanical interference with the flexible printed wiring 202.

Figure 7:
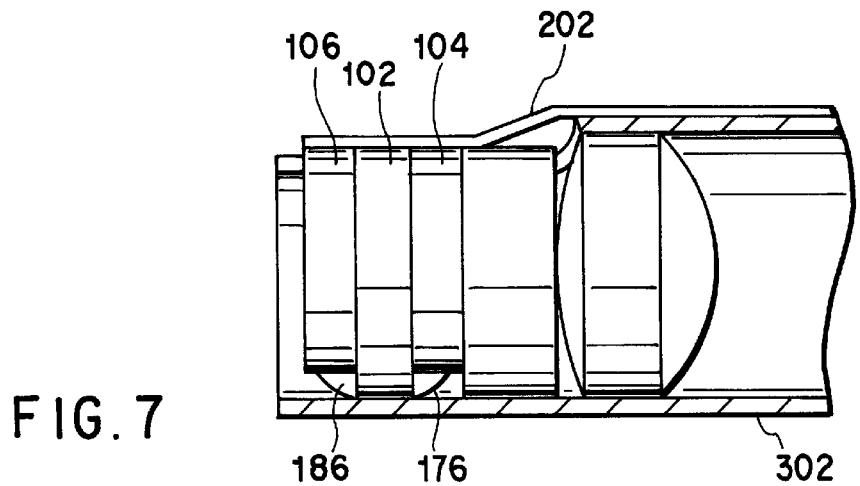
FIG. 7 is a partial side sectional view of the liquid crystal lens assembly comprising the liquid crystal lens unit and the optical system lens frame shown in FIG. 6.

After the liquid crystal lens 100 is inserted into the optical system lens frame 302, the notch 304 is filled with a shielding organic resin. Thereupon, the lens 100 is fixed to the lens frame 302. As shown in FIG. 7, moreover, the flexible printed wiring 202 is fixed to the outer surface of the lens frame 302.

In this manner, the optical system lens frame 302 and the liquid crystal lens unit mounted therein constitute a liquid crystal lens assembly.

The biconcave lens 102 has an outer diameter a little larger than those of the transparent flat plates 104 and 106. When the liquid crystal lens 100 is mounted in the optical system lens frame 302, the lens 102 is fitted in the lens frame 302. Thus, the optical axis of the lens 100 is automatically aligned with the axis of the lens frame 302.

The organic resin filling the notch 304 serves to fix the liquid crystal lens 100 to the optical system lens frame 302, and also to reinforce the lens frame 302 and prevent light from leaking into the lens frame 302.

The electrodes 126, 144 and 164, which will be connected electrically to the flexible printed wiring 202, are exposed, respectively, to the flat portions 116, 136 and 156 extending parallel to the optical axis. More specifically, the printed wiring 202 is wired on the flat portions 116, 136 and 156 which extend parallel to the optical axis. Thus, the printed wiring 202 can be drawn out along the outer peripheral surface of the optical system lens frame 302 without undergoing any mechanical stress caused by bending.

When the alternating voltages are not supplied to the liquid crystal layers 174 and 184, with respect to components of light polarized in a direction perpendicular to the directions of orientation of the orientation films, included in incident light through the transparent flat plate 106, the layer 184 serves as a medium having an ordinary index of a nematic liquid crystal, and the layer 174 as a medium having an extraordinary index of a nematic liquid crystal. With respect to components of light polarized in a direction parallel to the directions of orientation of the orientation films, in contrast with this, the layer 184 serves as a medium having an extraordinary index of a nematic liquid crystal, and the layer 174 as a medium having an ordinary index of nematic liquid crystal.

Since the concave surfaces of the biconcave lens 102 have shapes, which are symmetrical with respect to a plane perpendicular to the optical axis, the lens 102 serves to prevent double imaging, having their refractive surfaces located close to each other. Further, the lens 102 singly serves to orient the opposite orientation films of the liquid crystal layers 184 and 174 at right angles to each other.

When the alternating voltages are supplied to the liquid crystal layers 174 and 184, either of the layers 174 and 184 serves as a medium having an ordinary index of a nematic liquid crystal without regard to the direction of polarization of the incident light.

In the case where a nematic liquid crystal having negative dielectric anisotropy is used in place of the nematic liquid crystal having positive dielectric anisotropy, the function of the liquid crystal lens, which depends on the supply of the alternating voltages, is reversed. In this case, a state established when the alternating voltages are supplied corresponds to the aforesaid case where the alternating voltages are not supplied, and a state established when the alternating voltages are not supplied corresponds to the aforesaid case where the alternating voltages are supplied.

In a liquid crystal lens device of the present embodiment, as seen from the above description, the biconcave lens 102 and the transparent flat plates 104 and 106 can be cemented without requiring optical alignment. Cementing the lens 102 and the plates 104 and 106 is easy, moreover, since it requires only that the flat portions 116, 136 and 156 be flush with one another. Further, the electrical connection to the liquid crystal lens 100 only requires connection of the flexible printed wiring 202 having the two wires 204 and 206. Furthermore, there is no necessity for optical alignment between the liquid crystal lens 100 and the optical system lens frame 302. Owing to these advantages, the manufacturing cost can be lowered.

It is to be understood that the individual configurations of the above-described embodiment of the invention are subject to various changes and modifications.

According to the foregoing embodiment, for example, the transparent flat plate 104 has a substantially circular external shape. Alternatively, however, the flat plate 104 may be in the form of a polygon including sides, which correspond to the flat portions 136 and 138, respectively. Likewise, the transparent flat plate 106 may be in the form of a polygon including sides, which correspond to the flat portions 156 and 158, respectively. Further, the external shapes of the flat plates 104 and 106 may be different from that of the biconcave lens 102.

According to the embodiment described herein, the liquid crystal inlet ports 178 and 188 are located on the side opposite from the flat portions 136 and 156. However, the inlet ports 178 and 188 may be formed in any other portions than the flat portions 136 and 156.

The flexible printed wiring 202 may be replaced with a single-wire cable. Further, a conductive adhesive or solder may be used for the electrical connection between the electrodes 126, 144 and 164.

Second Embodiment

This embodiment is arranged basically in the same manner as the first embodiment. The second embodiment differs from the first embodiment only in the configurations of the flexible printed wiring and the notch. In the description to follow, stress will be put on the difference between the two embodiments.

Figure 9:
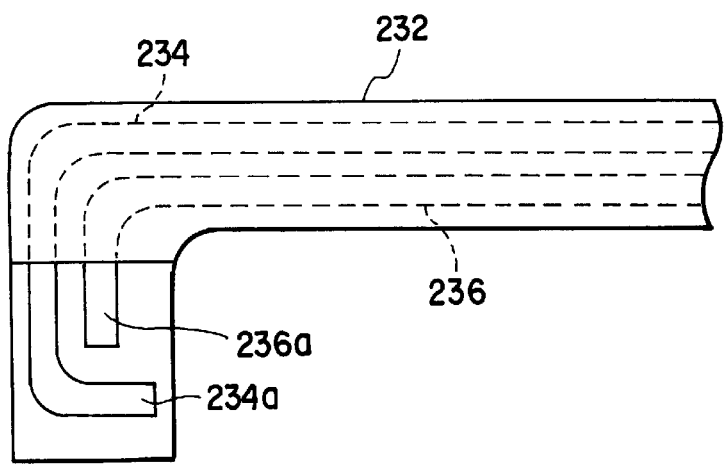
FIG. 9 is a plan view of a flexible printed wiring shown in FIG. 8.

As shown in FIG. 9, a flexible printed wiring 232 has an L-shaped external shape and includes two wiring patterns 234 and 236. An end portion 234a of the wiring pattern 234 functions as an electrode pad to be connected electrically to electrodes 144 and 164 when the pattern is wired on a liquid crystal lens 100. On the other hand, an end portion 236a of the wiring pattern 236 functions as an electrode pad to be connected electrically to an electrode 126 without electrically interfering with the electrodes 144 and 164.

Figure 8:
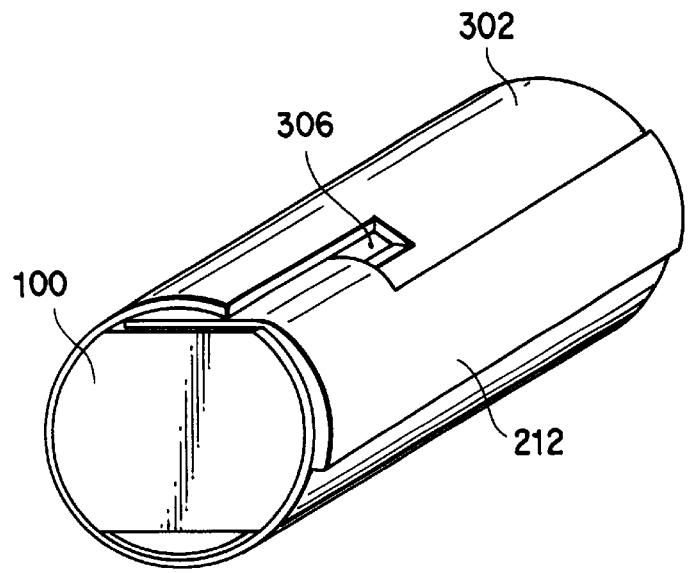
FIG. 8 is a perspective view of a liquid crystal lens assembly according to a second embodiment of the invention.

Corresponding to the shape of the flexible printed wiring 232, as shown in FIG. 8, an optical system lens frame 302 has a notch 306 through which the flexible printed wiring 232 extends to the outside when a liquid crystal lens unit that is composed of the liquid crystal lens 100 and the flexible printed wiring 232 thereon is wired. The notch 306 is expected only to have a width a little greater than the thickness of the flexible printed wiring 232.

Since the flexible printed wiring 232 crosses the optical system lens frame 302 with its smallest external dimension or thickness, the width of the notch 306 in the lens frame 302 need not be large.

Since the width of the notch 306 is smaller than that of the notch 304 shown in FIG. 6, the formation of the notch entails no substantial lowering of stiffness. Thus, the resulting liquid crystal lens assembly is higher in stiffness than the one shown in FIG. 7.

Third Embodiment

Figure 10:
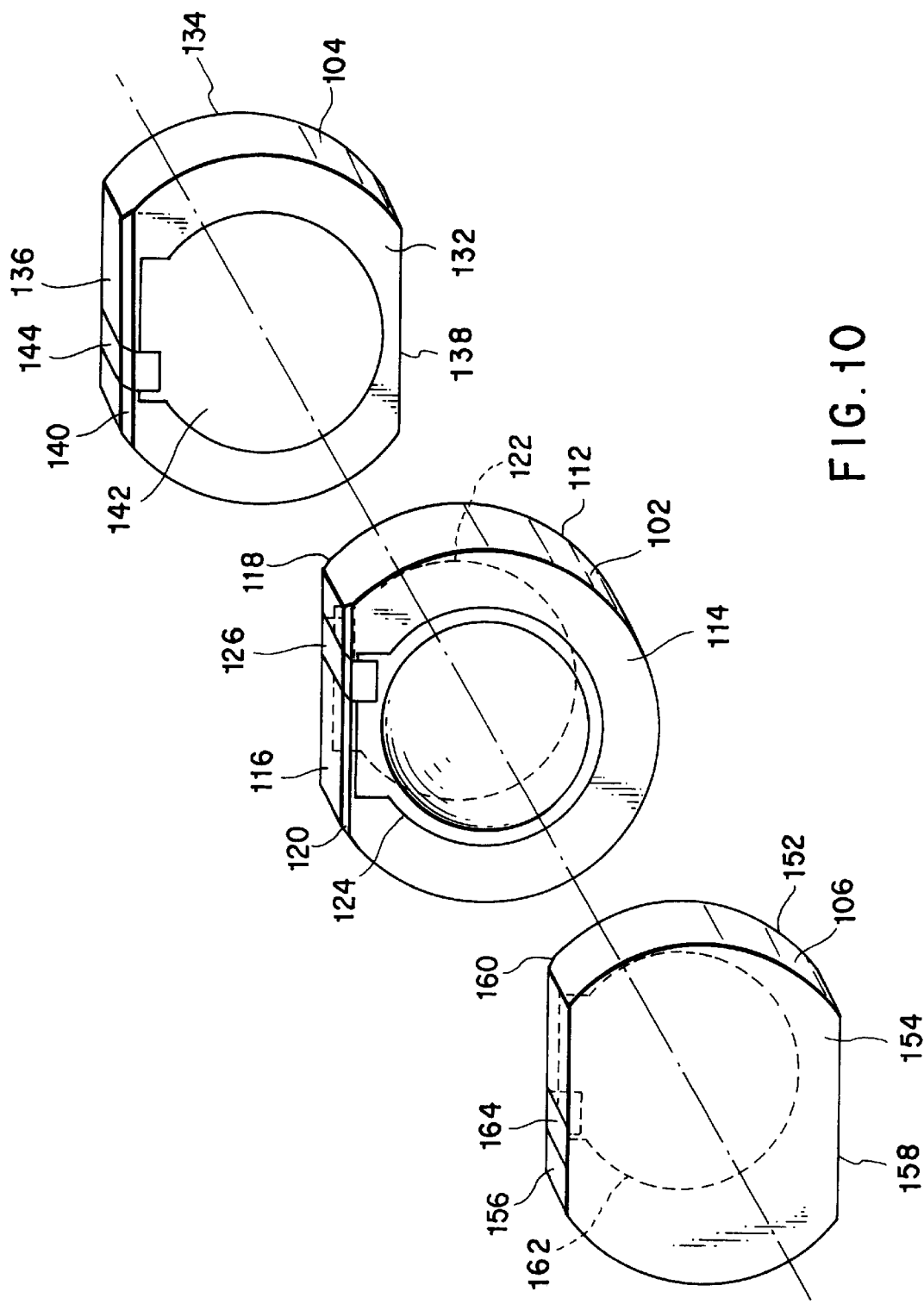
FIG. 10 is a perspective view showing before cemented principal elements of a liquid crystal lens according to a third embodiment of the invention.

This embodiment is arranged basically in the same manner as the first embodiment. The third embodiment differs from the first embodiment only in the shapes of the biconcave lens 102 and the electrode forming portions of the transparent flat plates 104 and 106. In the description with reference to FIG. 10 to follow, stress will be put on the difference between the two embodiments. In FIG. 10 and the preceding drawings, same reference numerals refer to equivalent members.

In the biconcave lens 102, as shown in FIG. 10, chamfer portions 118 and 120 are formed on edges between a principal surface 112 and a flat portion 116 and between a principal surface 114 and the flat portion 116, respectively. Further, the transparent flat plate 104 has a chamfer portion 140 formed on an edge between a principal surface 132 and a flat portion 136. Likewise, the transparent flat plate 106 has a chamfer portion 160 formed on an edge between a principal surface 152 and a flat portion 156.

The chamfer portions 118 and 120 of the biconcave lens 102 serve to ease the bend of the electrode 126, thereby lowering the incidence of disconnection. Likewise, the respective chamfer portions 140 and 160 of the transparent flat plates 104 and 106 ease the bend of the electrodes 144 and 164, thereby lowering the incidence of disconnection.

Thus, the reliability of the electrical connection between the liquid crystal lens and the flexible printed wiring of a liquid crystal lens unit is improved.

It is to be understood that the individual configurations of the above-described embodiment of the invention are subject to various changes and modifications.

The chamfer portions are expected only to be able to ease the bend of the electrodes, thereby lowering the incidence of disconnection. Although the chamfer portions shown in FIG. 10 are chamfered flat, therefore, they may alternatively be chamfered curvedly. For the same reason, each chamfer portion may be formed on a part of an edge.

Fourth Embodiment

This embodiment is arranged basically in the same manner as the first embodiment. The fourth embodiment differs from the first embodiment only in the way of arranging liquid crystal inlet ports. In the description with reference to FIGS. 11 to 13 to follow, stress will be put on the difference between the two embodiments. In FIGS. 11 to 13 and the preceding drawings, same reference numerals refer to equivalent members.

As shown in FIG. 12, a biconcave lens 102 and a transparent flat plate 104 are cemented to each other in a spaced manner by means of a sealant 192 including spacers dispersed therein. Likewise, the biconcave lens 102 and a transparent flat plate 106 are cemented to each other in a spaced manner by means of a sealant 194 including spacers dispersed therein.

As shown in FIG. 13, the sealant 194 circuits the biconcave lens 102 except a part of the whole flat portion 116 of the lens 102. Thus, the lens 102, transparent flat plate 106, and sealant 194 define a space for storing a liquid crystal material. The sealant 192 is provided in the same manner as the sealant 194, so that the lens 102, transparent flat plate 104, and sealant 192 define a space for storing a liquid crystal material.

As shown in FIG. 11, a flexible printed wiring 202 has openings 222 and 224. The opening 222 communicates with the space surrounded by the biconcave lens 102, transparent flat plate 104, and sealant 192, while the opening 224 communicates with the space surrounded by the lens 102, transparent flat plate 106, and sealant 194.

As shown in FIG. 12, therefore, a liquid crystal 174 is injected through the opening 222 into the space surrounded by the biconcave lens 102, transparent flat plate 104, and sealant 192, while a liquid crystal 184 is injected through the opening 224 into the space surrounded by the lens 102, flat plate 106, and sealant 194. After the liquid crystals are injected in this manner, the openings 222 and 224 are closed by means of a sealant 196. Thereupon, a liquid crystal lens unit is completed.

The opening 222 constitutes a liquid crystal inlet port for the space surrounded by the biconcave lens 102, transparent flat plate 104, and sealant 192, while the opening 224 constitutes a liquid crystal inlet port for the space surrounded by the lens 102, flat plate 106, and sealant 194. Further, the sealant 196 functions as a reinforcing agent for the attachment of the flexible printed wiring 202.

Thus, the reliability of connection of the flexible printed wiring 202 of the liquid crystal lens unit, which comprises the liquid crystal lens and the flexible printed wiring thereon, is improved.

It is to be understood that the individual configurations of the above-described embodiment of the invention are subject to various changes and modifications.

The openings in the flexible printed wiring 202 may be formed in any shapes provided that they can function as liquid crystal inlet ports. Therefore, the printed wiring 202 may be provided with one opening that communicates with both the space surrounded by the biconcave lens 102, transparent flat plate 104, and sealant 192 and the space surrounded by the lens 102, flat plate 106, and sealant 194, for example.

Fifth Embodiment

This embodiment is arranged basically in the same manner as the fourth embodiment. The fifth embodiment differs from the fourth embodiment only in the way of sealing the liquid crystal. In the description with reference to FIG. 14 to follow, stress will be put on the difference between the two embodiments. In FIG. 14 and the preceding drawings, same reference numerals refer to equivalent members.

In this embodiment, a flexible printed wiring 202 has no openings, and liquid crystals are injected before the printed wiring 202 is wired. More specifically, a liquid crystal 174 injected into a space surrounded by a biconcave lens 102, a transparent flat plate 104, and a sealant 192 and a liquid crystal 184 injected into a space surrounded by the lens 102, a transparent flat plate 106, and a sealant 194 are sealed by means of an anisotropic conductive adhesive 212, which wires the flexible printed wiring 202 and a liquid crystal lens 100 for conduction.

The anisotropic conductive adhesive 212 serves to make conduction between the flexible printed wiring 202 and the liquid crystal lens 100 and seal the liquid crystals. Thus, a process for making conduction between the printed wiring 202 and the lens 100 doubles as a process for sealing the liquid crystals.

Since the electrical connection and the liquid crystal sealing are carried out in one process, the number of processes for manufacturing a liquid crystal lens unit, which comprises a liquid crystal lens and a flexible printed wiring thereon, are reduced.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A liquid crystal lens fitted in a cylindrical optical system lens frame, comprising:

an optically transparent first optical member;

an optically transparent second optical member located on one side of the first optical member;

a first sealant for cementing the first and second optical members in a spaced manner;

an optically transparent third optical member located on the other side of the first optical member;

a second sealant for cementing the first and third optical members in a spaced manner;

a first liquid crystal stored in a space surrounded by the first and second optical members and the first sealant; and a second liquid crystal stored in a space surrounded by the first and third optical members and the second sealant, the first optical member including a first flat portion formed at least on a part of the outer periphery thereof and having a diameter such that the first optical member can be fitted in the cylindrical optical system lens frame, a first transparent electrode formed on a first surface opposite to the second optical member, a second transparent electrode formed on a second surface opposite to the third optical member, and a first electrode extending across the first flat portion and connected electrically to the first and second transparent electrodes, the second optical member including a second flat portion formed at least on a part of the outer periphery thereof and having a diameter a little smaller than that of the first optical member, a third transparent electrode formed on a third surface opposite to the first optical member, and a second electrode extending across the second flat portion and connected electrically to the third transparent electrode, and the third optical member including a third flat portion formed at least on a part of the outer periphery thereof and having a diameter a little smaller than that of the first optical member, a fourth transparent electrode formed on a fourth surface opposite to the first optical member, and a third electrode extending across the third flat portion and connected electrically to the fourth transparent electrode.

2. A liquid crystal lens according to claim 1, wherein said first optical member has a first concave surface formed on the first surface and a second concave surface formed on the second surface, the first and second concave surfaces being symmetrical with respect to a plane and having a common axis adapted to be aligned with the axis of the optical system lens frame when the first optical member is fitted in the lens frame.

3. A liquid crystal lens according to claim 1, wherein said first, second, and third optical members are arranged in a manner such that the first, second, and third flat portions are flush with one another.

4. A liquid crystal lens according to claim 3, wherein said second and third electrodes are situated on a straight line, and said first electrode is situated off the straight line on which the second and third electrodes are situated.

5. A liquid crystal lens according to claim 1, wherein said first optical member has a first chamfer portion formed on edges between the first flat portion and the first surface and a second chamfer portion formed on edges between the first flat portion and the second surface, said second optical member has a third chamfer portion formed on edges between the second flat portion and the third surface, and said third optical member has a fourth chamfer portion formed on edges between the third flat portion and the fourth surface.

6. A liquid crystal lens unit mounted in a cylindrical optical system lens frame, comprising:

the liquid crystal lens according to claim 1; and a flexible printed wiring wired the liquid crystal lens, the flexible printed wiring including a first wire connected electrically to the first electrode and a second wire connected electrically to the second and third electrodes.

7. A liquid crystal lens unit according to claim 6, wherein said flexible printed wiring is wired the liquid crystal lens by means of an anisotropic conductive adhesive.

8. A liquid crystal lens unit according to claim 6, wherein said flexible printed wiring has a strip-shaped external form.

9. A liquid crystal lens unit according to claim 6, wherein said flexible printed wiring has an L-shaped external form.

10. A liquid crystal lens unit according to claim 6, wherein said flexible printed wiring has at least one opening through which the first and second liquid crystals are injected.

11. A liquid crystal lens unit according to claim 6, wherein said first and second liquid crystals are sealed by means of the flexible printed wiring.

12. A liquid crystal lens assembly comprising:

the liquid crystal lens unit according to claim 6; and a cylindrical optical system lens frame on which the liquid crystal lens unit is mounted, the optical system lens frame having a notch through which the flexible printed wiring extends to the outside.

13. A liquid crystal lens assembly according to claim 12, wherein said flexible printed wiring has a strip-shaped external form, and said notch has a width greater than that of the flexible printed wiring.

14. A liquid crystal lens assembly according to claim 12, wherein said flexible printed wiring has an L-shaped external form, and said notch has a width greater than the thickness of the flexible printed wiring.

* * * * *